US011748067B2

(12) United States Patent
Smith

(10) Patent No.: US 11,748,067 B2
(45) Date of Patent: *Sep. 5, 2023

(54) SYSTEM AND METHOD FOR SOURCE CODE GENERATION

(71) Applicant: ELEMENTAL REASONING, LLC, Woodinville, WA (US)

(72) Inventor: Jason M. Smith, Woodinville, WA (US)

(73) Assignee: ELEMENTAL REASONING, LLC

( * ) Notice: Subject to any disclaimer, the term of this patent is extended or adjusted under 35 U.S.C. 154(b) by 18 days.

This patent is subject to a terminal disclaimer.

(21) Appl. No.: 17/591,513

(22) Filed: Feb. 2, 2022

(65) Prior Publication Data

US 2022/0156049 A1 May 19, 2022

Related U.S. Application Data

(63) Continuation of application No. 17/031,165, filed on Sep. 24, 2020, now Pat. No. 11,275,566.

(Continued)

(51) Int. Cl.
*G06F 8/35* (2018.01)
*G06N 5/04* (2023.01)
*G06F 8/20* (2018.01)

(52) U.S. Cl.
CPC .................. *G06F 8/35* (2013.01); *G06F 8/20* (2013.01); *G06N 5/04* (2013.01)

(58) Field of Classification Search
CPC ..... G06F 8/42; G06F 8/30; G06F 8/76; G06F 8/35; G06F 8/20; G06N 5/04
See application file for complete search history.

(56) References Cited

U.S. PATENT DOCUMENTS

2005/0166193 A1* 7/2005 Smith .................. G06F 8/75
717/143
2008/0082959 A1* 4/2008 Fowler ............... G06F 9/44505
717/104

(Continued)

OTHER PUBLICATIONS

David E. Bernholdt et al.; Raising the Level of Programming Abstraction in Scalable Programming Models; IEEE; 9 pages; retrieved on Jan. 11, 2023 (Year: 2004).*

(Continued)

*Primary Examiner* — S. Sough
*Assistant Examiner* — Cuong V Luu
(74) *Attorney, Agent, or Firm* — FisherBroyles, LLP; Richard T. Black

(57) ABSTRACT

Methods, systems, and computer program products for generating computer source code products. According to one method, an engineer creating or modifying an implementation of computer source code selects design patterns from a catalog of pre-existing design patterns. The design patterns are known abstractions that solve specific problems of computer program design and implementation. The selected design patterns are then bound to elements within a representation of the implementation known as a model. The model is then converted into a representation using elemental design patterns, and this abstraction model is used to generate the computer source code in any programming language. The abstraction model is also suitable as input for an automated inference engine for validation or verification purposes prior to or after the generation of the computer source code.

8 Claims, 8 Drawing Sheets

Related U.S. Application Data

(60) Provisional application No. 62/904,884, filed on Sep. 24, 2019.

(56) References Cited

U.S. PATENT DOCUMENTS

| | | | | |
|---|---|---|---|---|
| 2010/0131922 A1* | 5/2010 | Shenfield | ............... | G06F 8/20 |
| | | | | 717/121 |
| 2011/0088011 A1* | 4/2011 | Ouali | .................. | G06F 11/36 |
| | | | | 717/105 |

OTHER PUBLICATIONS

Chris Exton et al.; An Investigation of Java Abstraction Usage for Program Modifications; IEEE; 10 pages; retrieved on Jan. 11, 2023 (Year: 2005).*

* cited by examiner

SYSTEM AND METHOD FOR SOURCE CODE GENERATION

PRIORITY CLAIM

This application is a continuation of U.S. patent application Ser. No. 17/031,165 filed Sep. 24, 2020, now U.S. Pat. No. 11,275,566, which application claims the benefit of U.S. Provisional Patent Application Ser. No. 62/904,884, entitled SOURCE CODE GENERATION, filed Sep. 24, 2019, each of which is fully incorporated herein by reference in their entirety.

COPYRIGHT NOTICE

This disclosure is protected under United States and/or International Copyright Laws. © 2022 Elemental Reasoning, LLC. All Rights Reserved. A portion of the disclosure of this patent document contains material that is subject to copyright protection. The copyright owner has no objection to the facsimile reproduction by anyone of the patent document or the patent disclosure, as it appears in the Patent and/or Trademark Office patent file or records, but otherwise reserves all copyright rights whatsoever.

FIELD OF THE INVENTION

This invention relates generally to computer science and software engineering and, more specifically, to an automatic approach to source code generation. The subject matter described herein relates to methods, systems, and computer programs for describing, modeling, and generating computer program source code. More particularly, the subject matter described herein relates to methods, systems, and computer programs products for generating computer source code constructs in a programming-language-independent manner from a high-level abstraction of the intended product.

BACKGROUND OF THE INVENTION

A standard way of creating software is to first create a mental model of what is desired, by mapping concepts of the problem space to concepts in a proposed solution space. The most common solution space concepts are embodied as features in a programming language, allowing an implementor of that software system, the programmer, to succinctly describe what the solution should look like in such a way that it can be converted to machine language for execution by a computer.

The solution space offered by a programming language, however, is a tiny fraction of the solutions needed to properly implement most software. The remainder of the solution space is generated by a programmer utilizing experience, resources of other programmers, and hard work. Certain solutions are recreated time and time again, in different contexts and environments. Those that are found to be best practices are documented by programmers in various ways, the most successful common format is known as "design patterns."

Design patterns are an example of "abstractions," a description of a concept that is not sufficient on its own to be a solution, but one that can be imposed within a context to create a concrete solution.

Automated production of source code from a high-level description is known in computer science. Each new generation of programming language that introduces new levels of abstraction initially does so by converting those abstractions into language constructs from the previous language. Even the compilation of source code to a binary executable to run on a hardware system is the translation from high-level abstractions to an extremely low level assembly language.

Model-driven architecture is the methodology by which the design of an intended program or system of programs is described using very high-level abstractions, and used as a blueprint for one or more developers to implement the system, almost always manually. As the resulting system evolves, it often drifts away from the original intent, and loses fidelity against the requirements that led to its creation.

"Models" are descriptions of a system at a sufficiently high level of abstraction that they do not necessarily include all information needed to create an implementation, and may be in formal or informal textual or graphical notations. As described herein, the term "model" is used to refer to any such abstracted description of a system regardless of technology or notation used, and modeling tool to refer to any tooling that is used to create or edit a model regardless of technology, implementation, or method. Therefore, a textual description of a system (a model) may be formed using a text editor (modeling tool), although at a much lower level of efficiency and precision than producing a model in a specifically intended graphical design notation, such as the Unified Modeling Language or System Modeling Language (OMG-UML, 2017; OMG 2019). Additionally, as described herein, one who creates, edits, or uses a Model may be referred to as a user, designer, modeler, or engineer, as applicable.

U.S. Pat. No. 7,627,861 (the '861 patent) discloses a method for identifying the existence of design patterns extant within an implementation, directly from source code. This shows the main components of what was termed the System for Pattern Query and Recognition, or SPQR. The '861 patent (which is hereby incorporated by reference as if fully set forth herein) discloses a method by which existing source code can be analyzed to extract the design of a system and express it in terms of design patterns (Gamma et al., 1994), a body of software engineering literature that defines high-level abstractions for software developers to apply to their systems. The critical enabling contribution of '861 is the introduction of Elemental Design Patterns (EDPs), a novel approach to defining abstractions of software systems based on the fundamental foundations of programming languages. EDPs, and their associated formalism (p-calculus or rho-calculus), are a unique and now established publicly available body of literature for describing software systems. (Smith, Stotts 2002; Smith, Stotts 2003; Smith 2005; Smith 2012)

The primary workflow of '861 is as follows:
1) Use a parser to consume source code and parse it into an Abstract Syntax Tree (AST).
2) Convert the AST to a representation based on a mathematical notation for capturing critical relationships of programming independent of the programming language used in the mathematical notation of p-calculus. The result of the conversion is what is termed "facts" about the original source code implementation.
3) These facts are then suitable as input to an Automated Inference Engine (AIE). Two examples of AIEs would be an automated theorem prover (ATP), or a deductive database (DDB).
However, any system that can consume a set of facts and reason about them sufficiently to answer queries about how those fact inter-relate, can be considered an AIE.

4) To inform the AIE how to interpret the Facts, the p-calculus is also provided to the AIE, in a form sufficient for its consumption.

5) Finally, a Catalog of abstractions represented in the p-calculus is provided to the AIE, to give it a taxonomy to work with. This Catalog contains at a most fundamental level what are termed Elemental Design Patterns (EDPs).

6) These EDPs are the most atomic, the smallest possible, set of concepts that can be expressed in the p-calculus, and mapped to programming concepts in the solution space. These EDPs are also able to be composed into larger (higher-level) abstractions, including those design patterns that are best practice solutions.

7) The design patterns, these best practice solutions, are well documented. These become the target for queries about the source code for the AIE to answer: "Do they exist within the implementation?" This is accomplished within the AIE by using the most elemental form of the design patterns, expressed solely as EDPs and p-calculus, and then mapping those constructs to the Facts resulting from the analysis of the source code. The final results are presented to the user.

In this manner, developers were given a tool for answering some of the most important questions when facing an unfamiliar software system: What problems were the developers of that system trying to solve, and how did they solve them? By framing the description of the system in terms of known solutions that are commonly deployed, all that is not described by this approach becomes the truly interesting portion of the system. That is what is unique, that is what has value.

The catalog in step 5 above is currently defined in terms of the Structured Patterns Metamodel Standards (SPMS), an open specification that was first published in 2015 by the Object Management Group (OMG), the premiere standards defining organization (SDO) for the software engineering space. The EDPs were partially documented in the book Elemental Design Patterns, which published in the Addison-Wesley Professional Publishing imprint in 2012.

Prior research has been done into generation of source code from program design models, most commonly using UML as the modeling description environment. However, these approaches all suffer from the same issues:
1) The resulting code is generally of poor quality, and does not conform to accepted best practices of software implementation for the language it is generated in.
2) The resulting code is often not much more than a skeleton which requires substantial refactoring, or additional implementation, to create a workable system.
3) Once the code is generated and manually edited, it loses any coherence with the original design model, leading to what is known as 'design rot'.
4) Re-generation of the source code is typically impossible after manual editing.

The systems and methods of the present invention alleviate all four of these aforementioned issues by greatly enhancing the level of detail that is included in a model, without requiring the modeler to manually include or describe it. The systems and methods of the present invention also essentially reverse the process described in the '861 patent, to create a round-trip engineering opportunity that merges modeling and implementation tasks into a single life cycle.

As described hereinabove, the traditional way of creating software is to first create a mental model of what is desired, by mapping concepts of the problem space to concepts in a proposed solution space.

Programming languages offer a small portion of that solution space, but design patterns and other abstractions offer a much larger set of pieces of solutions to work with. The issue is that moving from those abstractions to a concrete implementation is time and experience intensive, and tends to be very error prone. The resulting system therefore requires further expensive testing and error fixing. When errors exist that allow disastrous effects to happen, such as security breaches, data loss, or data theft, they must be eradicated at almost any cost. It would be better if the errors were never introduced at all.

Working in the conceptual solution space is often assisted in software development by "models," which are represented in a "modeling language." The Unified Modeling Language (UML) is an example which offers a precise formulation of programming features, and offers a graphical representation that makes working with the models easier. In this manner, programmers can communicate the conceptual designs for the solutions they have in mind in a common language and understanding.

This is similar to the design patterns literature that provides a common taxonomy of solutions mapped to problems, and in fact the patterns are often described in terms of UML or another modeling language, but these representations are precise only with respect to UML. Because UML is not precise with respect to programming languages used for implementation, there is a gap, and that is where the errors are injected into the process.

SUMMARY

Provided herewith are systems and methods for generating computer source code from a model such that the resulting source code can be generated in a desired programming language, and the model and generated code form a correspondence to the intended conceptual design. The systems and methods include a step of selecting design patterns according to original design decisions to provide an abstract form model representing an abstracted view of a computer program. The design patterns are selected from a pre-existing catalog of design patterns, whose descriptions within the catalog include format definitions in terms of elemental design patterns (EDPs).

The systems and methods continue with a step of binding the selected design patterns to elements in the model to produce bindings. A further step follows of using the formal definitions of the EDPs to re-express the initial model as the abstract form model. The steps of selecting, including, creating, binding, and using can be optionally repeated if necessary to further express the abstract form model. From there, a step is performed of mapping the EPDs of the abstract form model to constructs in one of a target programming language, assembly language, or 'bytecode' language to produce mapped constructs.

Preferably afterwards, the method includes emitting a graph of the mapped constructs as embodied in the abstract form model in the selected one of the target programming language, assembly language or "bytecode" language, thereby creating a source code implementation of the computer program that corresponds to the original design decisions. Finally, the steps of selecting, including, creating, binding, using, mapping and emitting can be optionally repeated if necessary to create the source code implementation. While the preferred sequence of steps has been described, the various steps or subsets or supersets thereof optionally may be performed in any sequence.

The step of binding can include a further step of converting the abstract model to a format suitable for validation and verification using an automated inference engine. This is followed by a step of querying the automated inference engine to provide query results indicating suitability of the bindings and/or the need for additional bindings. Preferably after that, a step follows of providing the query results through a modeling tool to guide users as how and where to revise the binding, including desired roles and elements.

The systems and methods can also include a step of converting the resulting EDP expressed in the abstract form model to a format suitable for validation and verification against desired properties by an automated inference engine. This can additionally include a step of querying the automated inference engine to confirm properties of the model. This querying of the automated inference engine to confirm the properties of the model can be performed with the modeling tool.

Additionally, the systems and methods can include a step of using the graph to generate an abstract syntax tree representation of the abstract model, and emitting the abstract syntax tree in the target programming language. Alternatively, the graph can be used to generate an abstract syntax tree representation of the abstract model, and emitting the abstract syntax tree in an assembler language. The graph can be further alternatively used to generate an abstract syntax tree representation of the abstract model, and emitting the abstract syntax tree in an intermediate "byte-code" language.

According to an aspect of the invention, the present invention introduces a novel solution which reverses the direction of some or all portions of prior art solutions as mentioned hereinabove.

Other benefits and advantages of this invention will become apparent to those skilled in the art to which it pertains upon reading and understanding of the following detailed specification.

DETAILED DESCRIPTION

Figure 1:
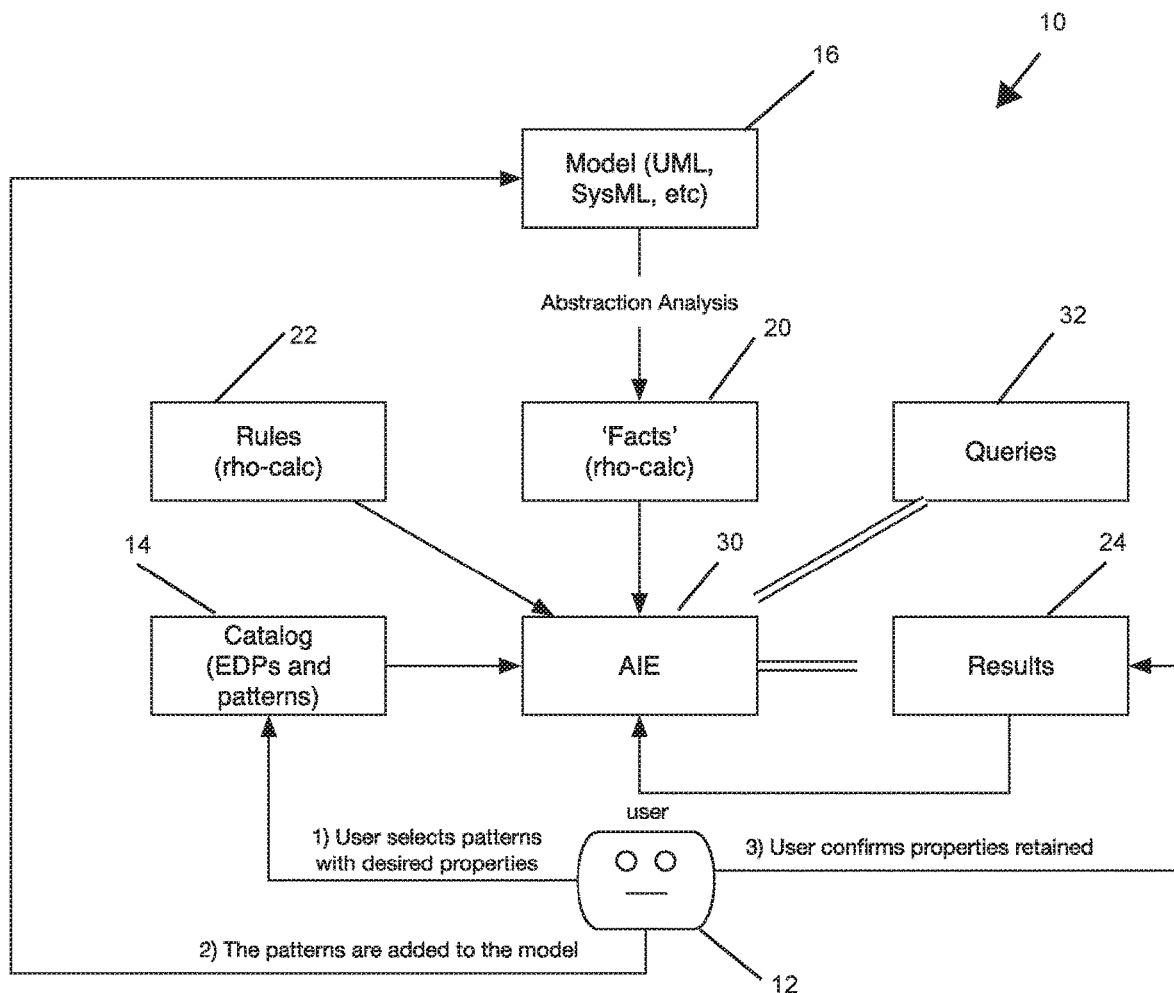
FIG. 1 is a flow chart showing steps in which a user selects, applies, and optionally confirms a design pattern.

Reference is now made to the drawings wherein the showings are for purposes of illustrating embodiments of the systems and methods only and not for purposes of limiting the same, and wherein like reference numerals are understood to refer to like components or steps.

Figure 2:
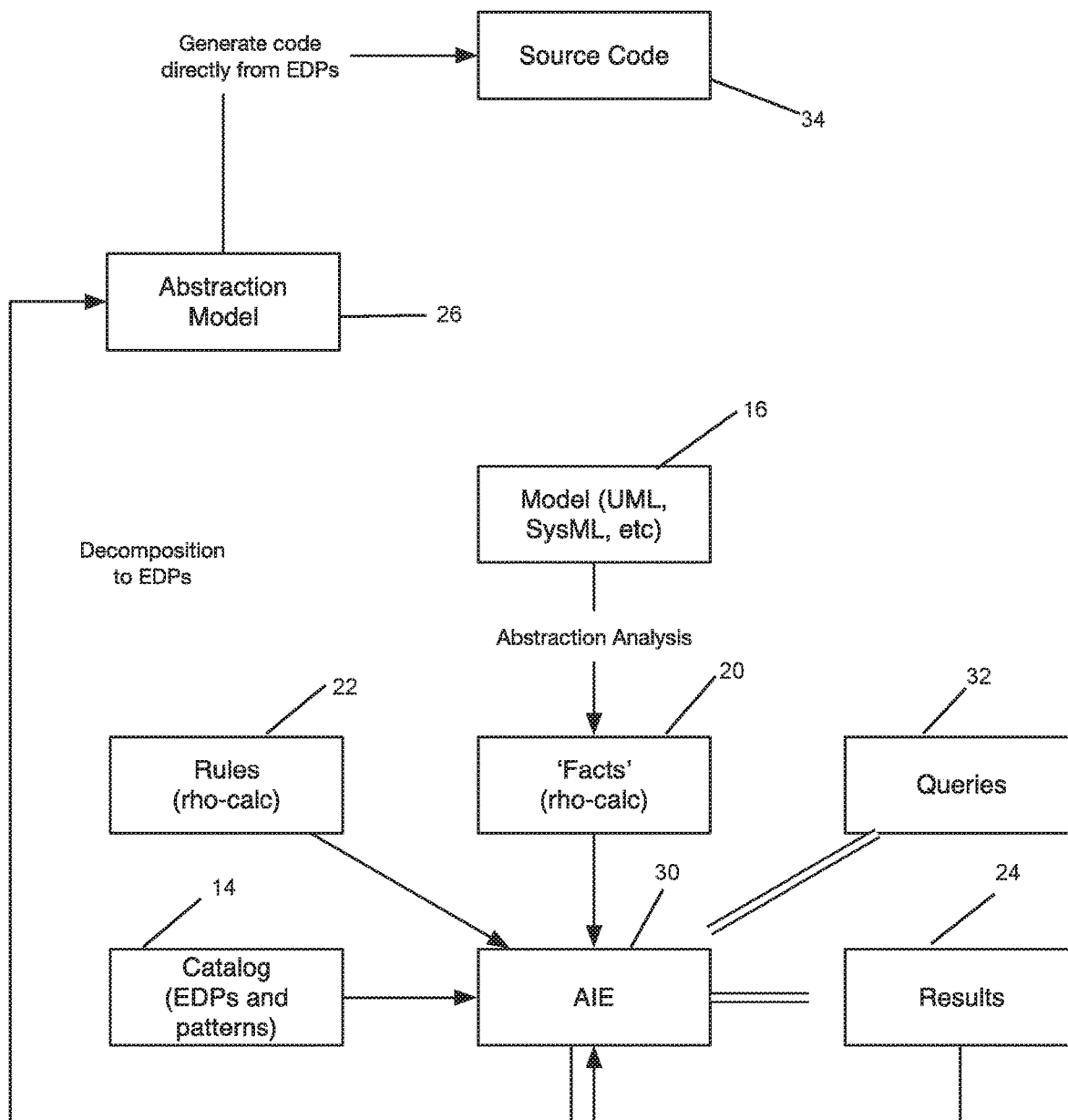
FIG. 2 is a flow chart showing steps in which code is generated from model.

As shown in the flow charts of FIG. 1 and FIG. 2, a novel embodiment of the present invention is contemplated to overcome the deficiencies of previous-type solutions by providing automation and mathematically rigorous verification processes. A preferred method 10 according to an exemplary embodiment of the present invention can be described as follows:

1) A user 12 can select a proper abstraction that fits their needs for a solution from a catalog 14 of abstractions and design patterns that can be defined in terms of the Structured Pattern Metamodel Standard (SPMS) and EDPs. The SPMS definitions can provide not only human-oriented descriptions of the problem and solution, but can also formal definitions as needed by the specifics of an implementation of this approach. Properties of the solutions are also defined, as appropriate.

2) The user 12 can, using modeling tool support, select an abstraction to be added to their model.

3) The model 16 can assist the user 12 in ensuring that the selected abstraction can be integrated, and also assists them in the integration to ensure that it fits correctly. This is possible because the abstractions are defined in terms of the EDPs, and the model 16 is also possible of being defined in the same terms.

4) If the model 16 has been defined, to this point, using the standard modeling languages, then an initial abstraction analysis is performed to produce a set of "facts" 20 regarding the model 16, defined in terms of the abstractions previously identified in the model 16, or those selected from the catalog 14. This is analogous to the facts created in the prior art solution mentioned hereinabove.

5) The facts 20 are then processed to decompose them into their constituent p-calculus 22 and EDPs using the definitions from the catalog 14, such that they are suitable for processing by an AIE 30 to produce a set of logical results 24.

6) The resulting model 16 plus the augmentation with the results 24 of the abstraction analysis result in an abstraction model 26. This abstraction model 26 (and various other aspects of the invention) are unique to the systems and methods of the present invention, and do not have an analogue elsewhere.

7) To assist the user in adding the abstractions selected in step 1, the abstraction model 26 is provided as input to an AIE 30, with the added imports of the formal definition of the abstraction(s) from the catalog 14, and the rules of p-calculus 22.

8) The AIE 30 can then find gaps in the user's integration of the selected abstraction with the abstraction model 26 and optionally offer alternatives for correcting any such gaps and/or mismatches.

9) As the abstraction model 26 is processed, feedback is provided to the user 12 by mapping the abstraction model 26 back to the model 16, and augmenting the standard modeling tool's graphical representation with the Pattern Instance Notation (PIN) from the SPMS standard.

10) This process (steps 1-9) continues until the user 12 is satisfied with the model 16 (and by extension the abstraction model).

11) The user 12 can request a property verification analysis, which pulls the relevant property definitions from the catalog 14 for the selected abstractions, and ensure that the stated properties still exist within the abstraction model. If there are any failures, the precise location and kind of failure is reported back to the user or the system for further inspection.

12) Once the property verification analysis is passed (or skipped), the user 12 can request code generation to be performed. This generation of source code 34 is performed by using the EDPs of the abstraction model 26 as a guide. Since each one is the description of a very small abstraction, but one that is at a higher level of abstraction than programming language features, they form a bridge between the conceptual space and the implementation space.

In particular, the final step of generating source code 34 overcomes the deficiencies of the prior art, since generated code from models has traditionally been deficient compared to code written by a human developer. As a result, software having machine generated code is extremely difficult to understand by human developers, leading to a mistrust of machine systems that generates such code.

By using the above approach, the resulting source code 34 is not only easier to read, but has been formally verified to have the properties that were requested by the user in the beginning. These properties include those concerning security, maintainability, and performance.

A further alternate embodiment of the present invention can be described as follows:

Overview

The method of the present invention can be accomplished by allowing an engineer or modeler to select from a catalog of abstractions or design patterns when creating or editing their model for the desired system. Design patterns are ready-made solutions to common program design problems, and there are hundreds of them described in the literature. The present method makes no distinction between the terms "design patterns" and "abstractions" and will use them interchangeably. It is known in the art to incorporate abstractions or design patterns into a model. Existing tools such as NoMagic's MagicDraw allow a user to select from "design pattern templates," however, the resulting integration with the model is poor, and requires the user to manually provide the details of how the solution will operate, how it interacts with the remainder of the model, and once applied, the information that the resulting model includes in a design pattern is quickly lost. This failure to preserve conceptual information necessary to understanding how the elements of a desired pattern interact and mutually relate drastically limits opportunities for implementation fidelity, and puts a halt to later refinement of the design with any hope for retaining the initial design decisions and principles that led to the selection of the pattern.

The systems and methods of the present invention as described herein below preferably specifies that the design patterns in the catalog be defined using the EDPs, which are a foundational description language that is rooted in the mathematical formalisms of programming languages. A preferred feature is that of "reliances," a formalism that can informally thought of as "relationships," and is embodied in the ρ-calculus or rho-calculus. EDPs form a bridge between the abstractions of programming as conceived of and reasoned through by human engineers, and the mathematical rigor of ρ-calculus that is required for automated processing and reasoning. The automated processing described in this method includes expressing a model or system encoded in EDPs, as the equivalent ρ-calculus expressions, combining that expression with the rules of ρ-calculus, and forming a collection of facts and axioms that are logically consistent and able to be used as input to any number of logical solver systems for query. As described in the prior art in the context of a different system (e.g., Smith 2012, Smith 2005), an example of this would be expressing the "Decorator" design pattern as a composition of mathematical expressions, beginning with the base features of ρ-calculus and defining ever more complex abstractions. Such a process, as explained in the aforementioned prior art, begins with defining four Elemental Design Patterns: Inheritance, Abstract Interface, Extend Method, and Trusted Redirection.

$E \vdash$ Subclass, Superclass, Subclass $<:$ Superclass
Inheritance(Superclass : Superclass, Subclass : Subclass)
    $E \vdash C, C : [l_i : B_i^{i \in 1..n}]$
    $C \equiv [l_i = b_i^{i \in 1..m-1, n+1..n}, l_m = [\ ]\ ]$
AbstractInterface(Abstractor : C, operation : $l_m$)
    operation $\in$ meth(OriginalBehavior),
    ExtendedBehavior $<:$ OriginalBehavior,
    eb : ExtendedBehavior,
    eb.operation $<_\mu^{+,+}$ eb$^\wedge$operation
ExtendMethod(OriginalBehavior : OriginalBehavior,
    ExtendedBehavior : ExtendedBehavior,
    operation : operation)
Redirector $<:$ FamilyHead,
    r : Redirector,
    fh : FamilyHead,
    r.operation $<_\mu^{-,+}$ fh.operation,
TrustedRedirection(Redirector : Redirector, FamilyHead : FamilyHead,
    target : fh, operation : operation)

These three EDPs are abstractions that encapsulate precise mathematic representations of reliances between elements of programming languages. The above equations indicate what axiomatic clauses are required, above the horizontal line, to be able to deduce the existence of the abstraction, below the horizontal line. In the above examples, all elements above the horizontal line are strictly defined in ρ-calculus.

These abstractions can be used to build ever more complex abstractions, such as Fulfill Method, Objectifier, Object Recursion, and finally, an example of a "classic" design pattern, Decorator. In each case, instances of existing EDPs and other design patterns above the line are required to be able to define the abstraction below the line.

AbstractInterface(Abstractor : Abstractor, operation : operation$_n$),
Inheritance(Superclass : Abstractor, Subclass : ConcreteClass),
ConcreteClass $\equiv$ [operation$_i \Leftarrow b_i^{i \in 1..n-1, n+1..m}$, operation$_n \Leftarrow b_n$]
    FulfillMethod(Abstractor : Abstractor, Fulfiller : ConcreteClass,
        operation : operation$_n$)
    Objectifier Base : $[l_i : B_i^{i \in 1..n}]$,
    Client: [ref : Objectifier],
    Client.someMethod $<_\mu$ Client.ref.l$_i$,
    FulfillMethod(Abstractor : ObjectifierBase,
        Fulfiller : ConcreteObjectifier, operation : $l_i)^{i \in 1..n}$
    Objectifier(Objectifier : ObjectifierBase,
        ConcreteClass : ConcreteObjectifier, operation : $l_i)$
Objectifier(Objectifier : Handler, ConcreteClass : Recursor$_i^{i \in 1..m}$,
    operation : handleRequest),
Objectifier(Objectifier : Handler, ConcreteClass : Terminator$_j^{j \in 1..n}$,
    operation: handleRequest),
init.someMethod $<_\mu$ obj.handleRequest,
init : Initiator,
obj : Handler,
TrustedRedirection(Redirector : Recursor, FamilyHead : Handler,
    target : obj,operation: handleRequest),
!TrustedRedirection(Redirector : Terminator, FamilyHead : Handler,
    target : obj,operation : handleRequest)
ObjectRecursion(Handler : Handler, Recursor : Recursor$_i^{i \in 1..m}$,
    Terminator : Terminator$_j^{j \in 1..n}$, Initiator : Initiator,
    handleRequest : handleRequest, successor : obj)

-continued

```
ObjectRecursion(Handler : Component, Recursor : Decorator_i^{i∈1...m},
        Terminator : ConcreteComponent_j^{j∈1...n}, Initiator : any
        handleRequest : operation_k^{k∈1...o}, successor :),
ExtendMethod(OriginalBehavior : Decorator
        ExtendedBehavior : ConcreteDecorator B_k^{k∈1...o},
        operation : operation_k^{k∈1...o})
!ExtendMethod(OriginalBehavior : Decorator
        ExtendedBehavior : ConcreteDecorator A_l^{l∈1...p},
        operation : operation_l^{l∈1...p})
Decorator(Component : Component, Decorator : Decorator_i^{i∈1...m},
        ConcreteComponent : ConcreteComponent_j^{j∈1...n},
        ConcreteDecorator : ConcreteDecorator B_k^{k∈1...o},
        Terminator : ConcreteDecorator A_l^{l∈1...p},
        operation : operation_k^{k∈1...o+p})
```

These formal definitions are suitable for automated processing by any number of approaches, including first order logic query systems such as Prolog, automated theorem provers such as Prover9, and deductive databases such as those using Datalog, as also known from the prior art.

These definitions are also decomposable, as well as composable. Starting with a complex abstraction, it is possible to decompose its definition down into its constituent p-calculus clauses and operate and reason on them at a very fine-grained level of detail. These lowest level clauses are congruent with specific elements of programming languages, but are general enough that they are not tied to any one specific programming language. This definition of EDPs using ρ-calculus has not previously been applied in the manner described in this system and method.

Catalog Features

One approach for creating the Catalog is the Structured Pattern Metamodel Standard (SPMS) from the Object Management Group (OMG). (OMG-SPMS, 2017) OMG is an international standards development organization (SDO) that publishes specifications for defining and sharing data and models of systems, primarily in software and systems engineering. SPMS is a specification that supports the creation of a catalog of design patterns and is suited for this purpose, but any solution that offers similar functionality will satisfy the need.

Preferably, the definitions of the design patterns in the catalog are expressed using EDPs as their foundational language, and the definitions are able to be composed and decomposed at will. SPMS supports both of these features natively but neither is necessary for these systems and methods to be implemented.

1) Expressing patterns in terms of EDPs ensures that the definitions are semantically sound, and mathematically complete. Semantic soundness is preferred for aiding human comprehension, and mathematical completeness is preferred for the ability to reason and form inferences from the definitions for purposes of validation and verification.

2) Composition and decomposition provide a mathematically complete formation and analysis framework that simplifies the validation and verification processes, and help enable a unique and novel approach to source code generation.

Modeling and Design Pattern Selection

Given a catalog of such design patterns, an engineer or other user of a modeling tool may select design patterns suitable for their problem space, and add, impose, or imbue an instance of them into the model or system description they are editing. Design patterns may form the framework of a new implementation, or they can be used to soundly and formally describe relationships within an existing implementation.

An instance of a design pattern can be a copy of, or a reference to the description of the design pattern from the catalog. A copy creates a stand-alone instance, while a reference allows for updates to the catalog entries to be propagated through to the model. Either is allowable in these systems and methods, and should be selected as necessary or preferred for the modeling tools and situation.

The definition of the design pattern as described in EDPs (and in SPMS) includes a role and binding approach, where roles in the pattern definition are bound to elements within the model. This binding mimics and matches the roles used to define the ρ-calculus expressions of the EDPs and other design patterns.

Figure 3:
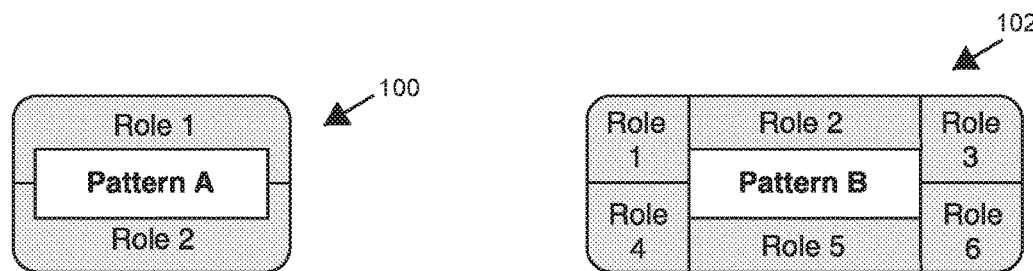
FIG. 3 is an example of SPMS's Pattern Instance Notation (PIN).

In the case of graphical notation modeling tools, a notation such as the Pattern Instance Notation (PIN) approach from SPMS may be used (OMG-SPMS, 2017). Examples 100, 102 of this notation are shown in FIG. 3 and will be used in subsequent figures. This provides a clear visual representation of the roles and bindings approach, but is not required for this method, it is simply used here as a clear and standard notation. In the case of textual notation modeling, other approaches may be used.

When a design pattern instance is added to a model, its roles can be bound to elements within the model at any time prior to code generation. The modeling tool will provide a mechanism for the user to do so.

When a design pattern instance is imbued or imposed on a model, it is typically an explicit action to document existing elements and their relationships within the model and may require immediate binding of relevant roles to existing elements.

Figure 4:
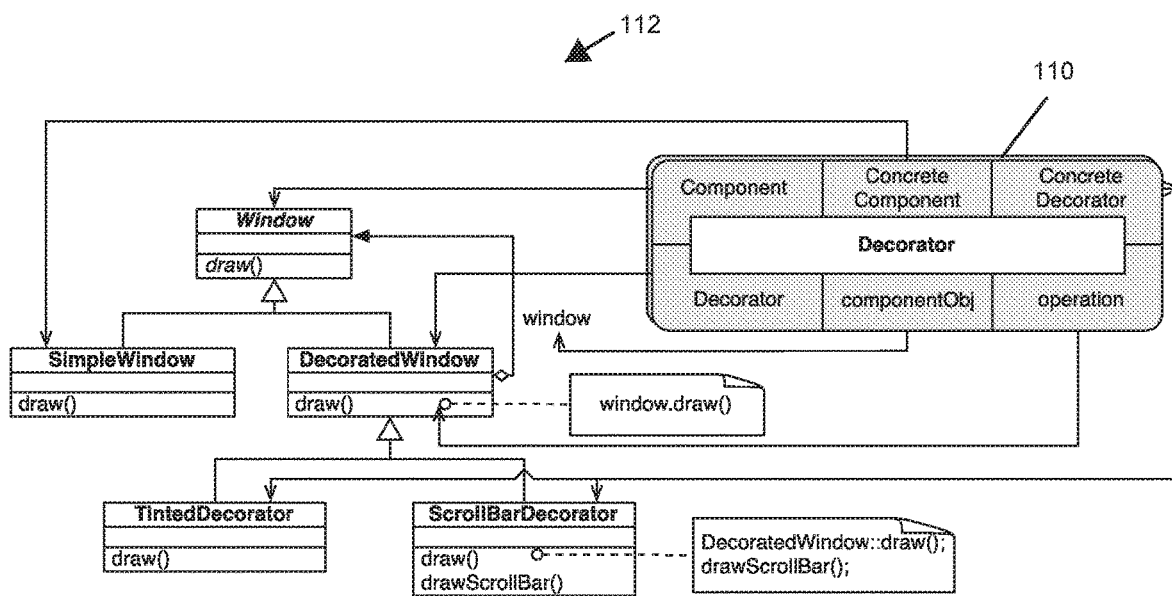
FIG. 4 is a depiction of an instance of the Decorator design pattern added/imbued/imposed onto a UML model.

Either approach is allowable in these systems and methods and should be chosen by the user and/or modeling tool implementor as needed. The result of adding, imbuing, or imposing, and then binding an instance of a design pattern to a model may look as in FIG. 4, where a PIN representation 110 of the Decorator design pattern has been added to a model 112 expressing the traditional UML representation of the same pattern.

Elements within a modeling language such as UML or SysML are generally representations of concrete elements within a system, while design patterns are representations of abstractions. By binding roles of abstractions to concrete elements in a model, it creates a web of relationships between those elements that are not directly expressible within the modeling language itself, and did not otherwise previously exist or arise from any prior systems or methods.

Conceptual Decomposition

The design patterns instantiated by the designer in the model are preferably each backed by a relevant definition of the design pattern, and that definition is provided in terms of EDPs. This means that even though the designer is working with extremely high-level abstractions, there is a low-level definition that is available for automated and automation purposes.

This method describes one such purpose, in which a high-level instance of a design is decomposed into a structure of EDPs, where each EDP represents exactly one relationship between two elements in a model, and therefore in an implemented system expressing that model.

Figure 5:
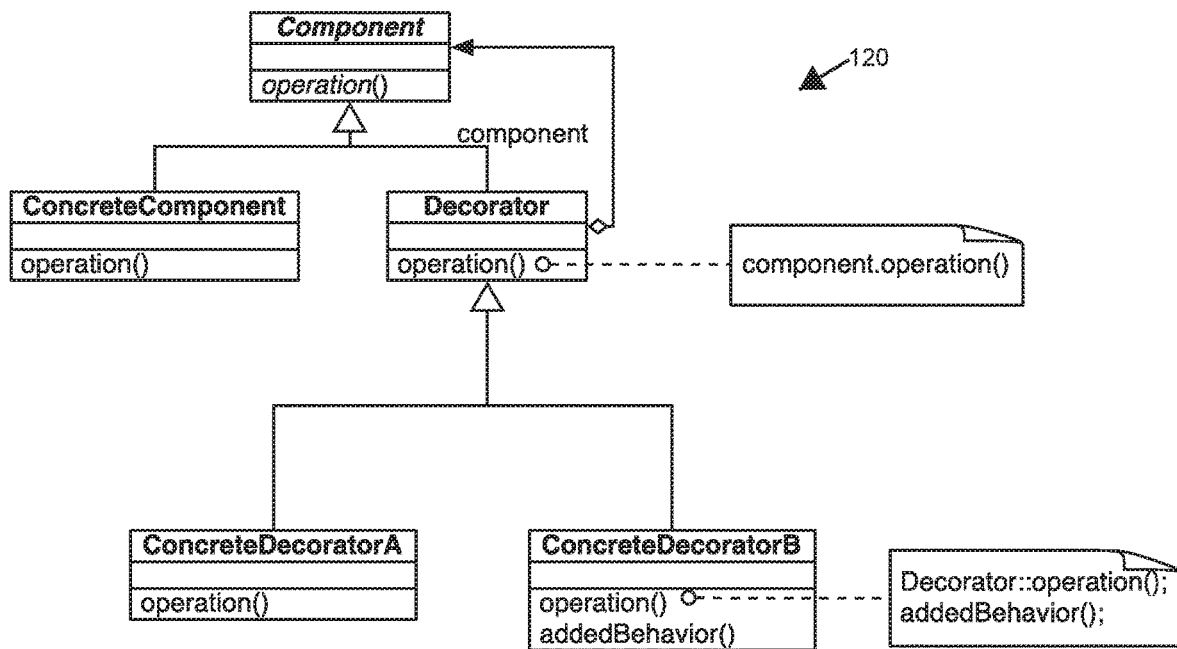
FIG. 5 is a depiction of the Decorator design pattern as shown in FIG. 4 as expressed in Unified Modeling Language (UML).
Figure 6:
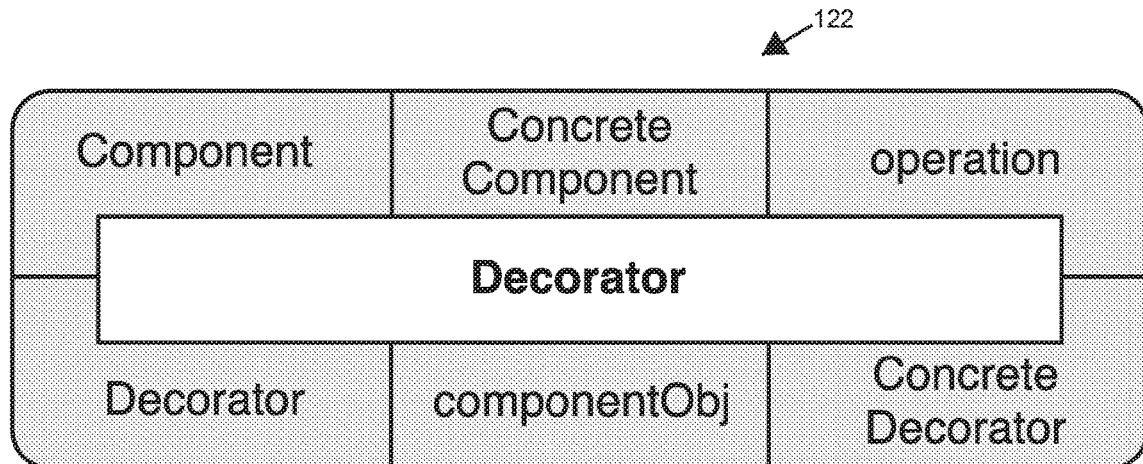
FIG. 6 is a depiction of the Decorator design pattern as expressed in PIN.

FIG. 5 shows an example 120 of a very common design pattern, the Decorator design pattern, as expressed in UML as is the accepted industry norm. It is then expressed in FIG. 6 in the PIN graphical notation 122 from SPMS. This expression directly conforms to the description of the design pattern's roles as found in SPMS.

Figure 7:
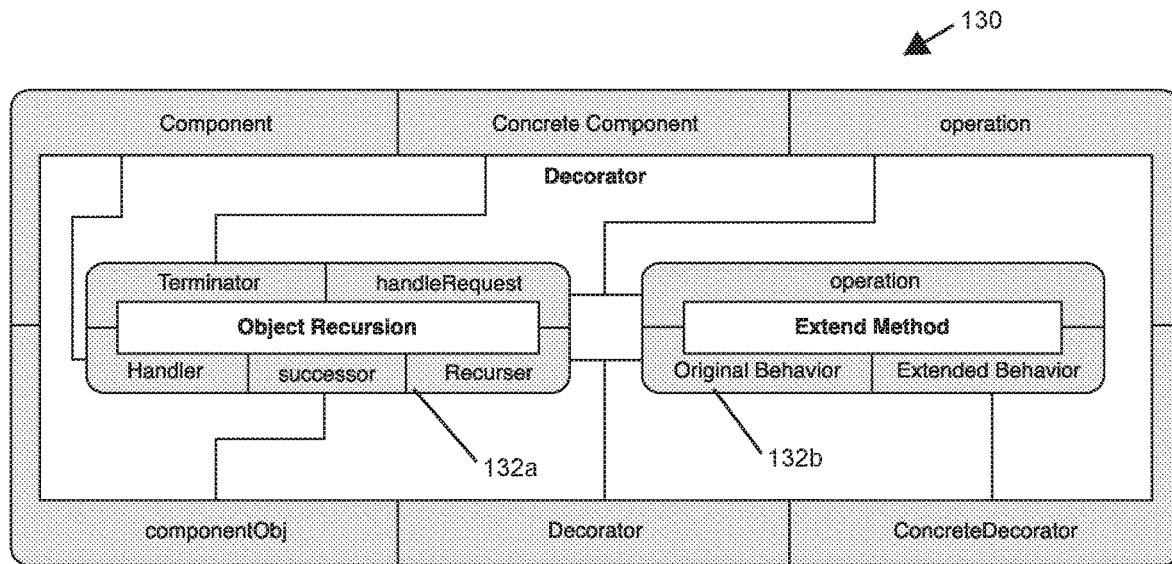
FIG. 7 is a depiction of the Decorator design pattern as PIN, in a first expansion.

This pattern can be decomposed into a series of internal structures that expose the relationships that make up the Decorator design pattern, as shown in FIG. 7 through FIG. 10. Each subsequent figure "expands" a particular pattern, using the definition of the abstraction as provided in SPMS, until in FIG. 10 the Decorator design pattern is fully expressed in terms of only EDPs. Each of the patterns in this process is defined with the catalog of design patterns and can be used on its own. For instance, FIG. 7 shows the definition of the Decorator design pattern in terms of two other design patterns, Object Recursion 132a and Extend Method 132b. Extend Method 132b is an example of an EDP, and it has no further decomposition that can occur.

Figure 8:
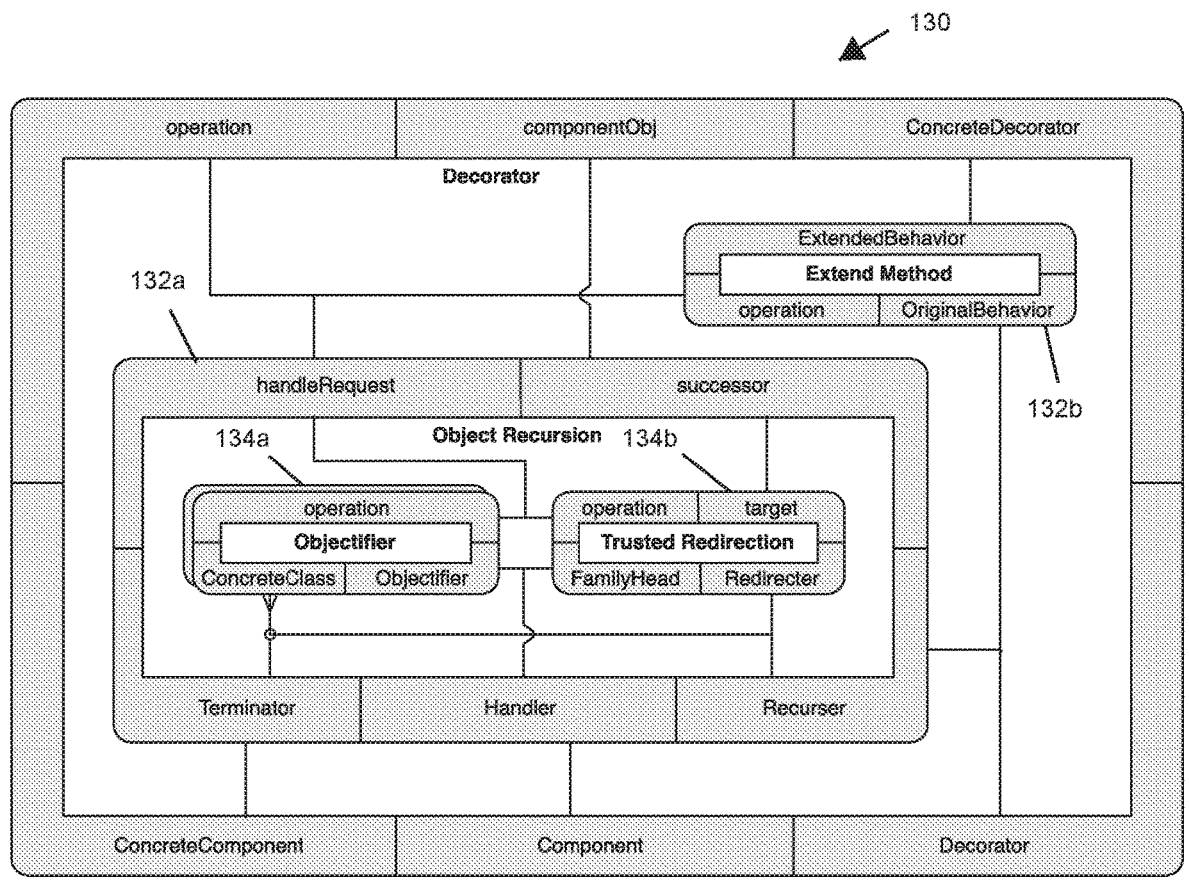
FIG. 8 is a depiction of the Decorator design pattern as PIN, in a second expansion.
Figure 9:
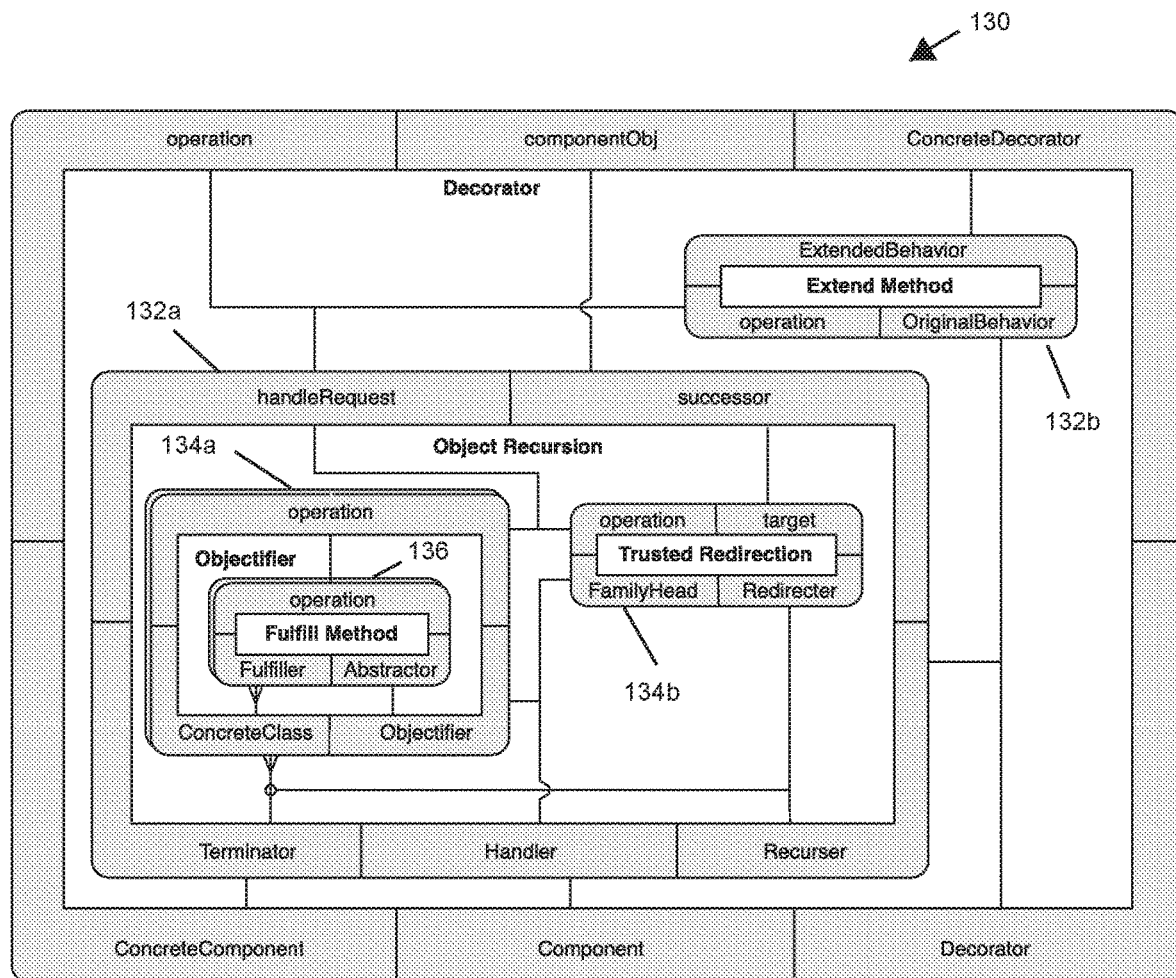
FIG. 9 is a depiction of the Decorator design pattern as PIN, in a third expansion.
Figure 10:
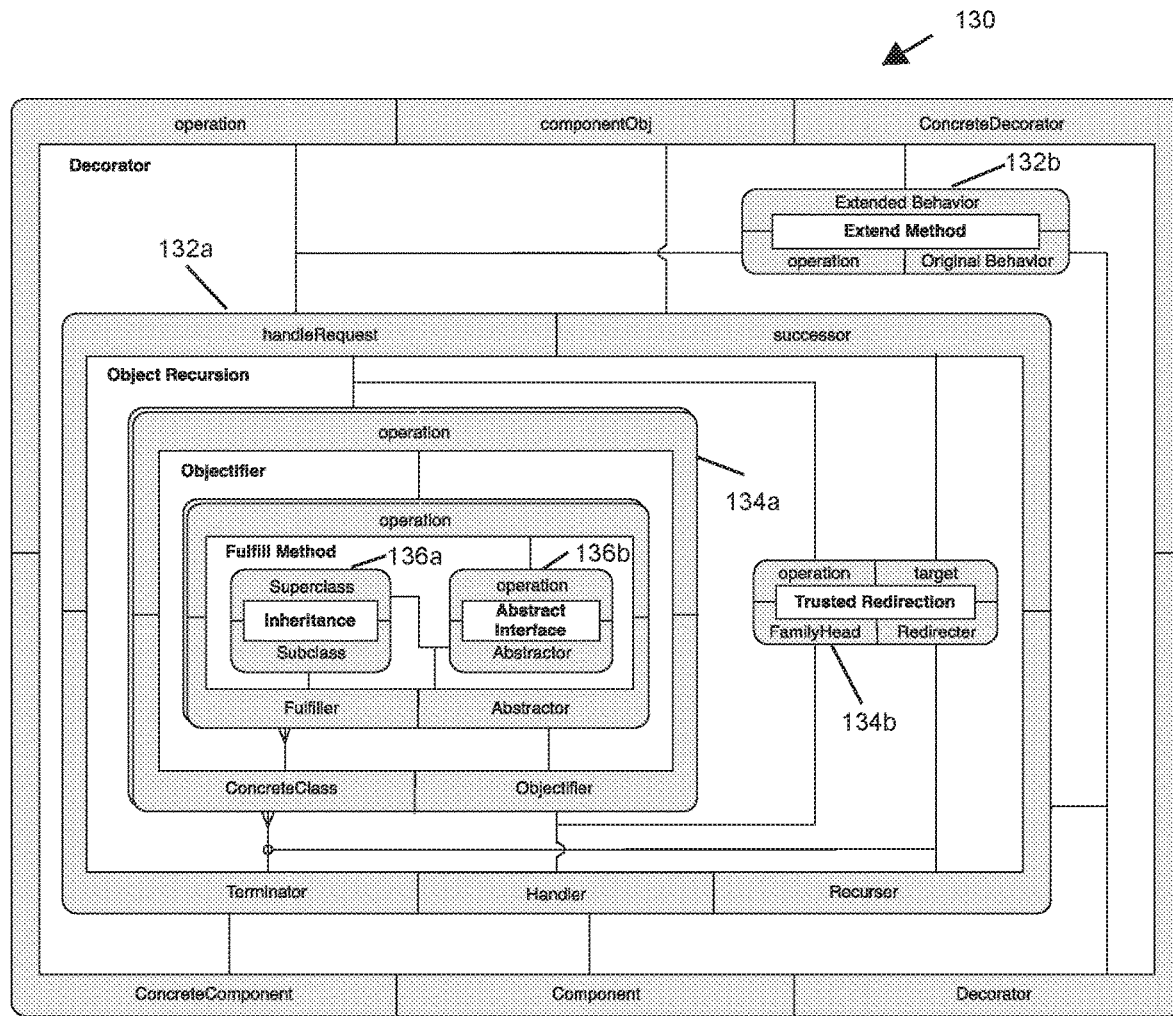
FIG. 10 is a depiction of the Decorator design pattern as PIN, in a final expansion.

As shown in the further expansion of FIG. 8, Object Recursion 132a is defined in the SPMS Catalog as comprised of two other design patterns, Objectifier 134a and Trusted Redirection 134b. Trusted Redirection 134b is another EDP, so it is left alone. As further shown in FIG. 9, Objectifier 134a is expanded to its definition using multiple instances of Fulfill Method 136. Finally in FIG. 10, Fulfill Method is expanded into its EDPs 138a, 138b with its definition to our final structure in FIG. 10, and explicit relationships between their component roles.

As shown the figures and as explained hereinabove, the expression of the Decorator design pattern using only EDPs is what establishes the foundation for further processing and code generation, yet this decomposed expression is not necessarily presented to the user. The complexity is preserved, yet hidden, by the modeling tool and the SPMS-provided definition of the design pattern using EDPs.

Abstraction Analysis

No matter the modeling language that is used to describe the software system under consideration, there will be an underlying syntax and semantics to that modeling language. That syntax can be expressed in a format that is suitable for automated reasoning, expressed as "facts" about the system.

These facts are necessarily expressible in terms of EDPs and the $\rho$-calculus due to the foundational relationship between the latter and programming language theory. EDPs are the link between the abstractions of the model and the mathematical representation of $\rho$-calculus.

What can be expressed in a model of a system can therefore be expressed in terms of $\rho$-calculus. This combination of the facts of the system, as well as the formalizations of $\rho$-calculus that define the rules for inference and transformation of those facts, together form the abstract model of the system.

The abstract model can be expressed in a format suitable for an Automated Inference Engine (AIE), which is any automated reasoning system that can apply first-order or higher logic to infer conclusions about the system being modeled. For purposes of this disclosure, a simple first-order solver such as a Prolog engine is sufficient.

Property Verification

An optional step preferably before code generation is to verify the model for specific properties, such as adherence to security protocols (in the case of selecting security patterns), disallowance of exhibiting undesired behavior or design (in the case of comparing against what are known as malignant patterns or anti-patterns), and so on.

This is preferably accomplished by applying queries to the AIE regarding the facts of the abstract model, such that they can be answered in a methodical and precise manner.

Code Generation

Preferably, each EDP in the fully expanded definition of the Decorator design pattern is congruent with exactly one relationship between elements of a model, or elements of a program, by nature of its definition in $\rho$-calculus. By decomposing a high-level abstraction to a graph of EDPs and knowing precisely how the roles of the high-level abstraction are bound to the elements of the model or system, we know precisely which such elements are the endpoints of the relationships defined by the EDPs.

Knowing further that the abstract model can be queried for additional information regarding the relationship of the elements of the model which are bound to the EDPs, to other elements of the model, we can quickly and formally ensure that desired properties of both the high-level and low-level abstractions are evident and preserved.

Thus, these systems and methods make code generation almost trivial, yet ensure that the resultant code adheres to the high-level abstractions that were embodied in the design patterns initially selected by the designer.

Due to their formal basis in $\rho$-calculus and the foundations of programming language theory, EDPs form a comprehensive and complete language for expressing all available relationships between elements of programming languages. Preferably, every relationship in a system can be expressed as an EDP or structure formed from EDPs, and every EDP can be expressed directly as a programming language construct. Note that this is not dependent on what programming language is being used to express the model, the EDP approach applies at the foundational level on which all programming languages are created.

What remains is to map individual EDPs to the syntax of a desired target programming language. Depending on the idiomatic family of the target programming language (procedural, object-oriented, function, etc.), certain EDPs will be expressible as a single language artifact, while others may require more complex representations. However, each EDP has a "best practice" expression that can be applied by virtue of it having a canonical expression in p-calculus.

For instance, when generating code for an instance of the Iteration EDP that wraps a call to a function, such as one called do_operation( ), a language such as Python that directly supports iterable containers as first-class elements might have it expressed as:

```
my_list = [ ]
# list operations that alter list
for i in my_list:
    do_operation(i)
```

Whereas in a language such as C++ 03, where iterable containers are supported via standard libraries:

```
std::list<int> my_list;
// list operations that alter list
for (int* i = my_list.begin( ); i != my_list.end( ); i++) {
    do_operation(*i);
}
```

Or in C++ 11, where the range-based for loop construct has been introduced:

```
std::list<int> my_list;
// list operations that alter list
for (int i : my_list) {
    do_operation(i);
}
```

And in a lower level language such as C, where there is no native support for iterable containers:

```
int my_list_length = 0;
int[ ] my_list;
/* list operations that alter list and also keep
my_list_length up to date */
for (int i = 0; i < my_list_length; i++) {
   do_operation(my_list[i]);
}
```

Preferably, in each case, the code generated is done using idioms that are native to the target language, and are closer to what one would expect from an experienced programmer in each language. Code generation is also optimized in that preferably each EDP is expressed as a construct in each target language of interest once. Automatic generation in any target language for which there is an EDP mapping is simple and direct.

Note that the language of choice may be as low-level in abstraction as assembler language for direct compilation to a binary executable, a tool-specific intermediate representation (LLVM 2020) or a "bytecode" language such as used by the Java® Virtual Machine or LLVM compilation system, for later conversion or processing. (Oracle, 2015; LLVM 2020)

EXAMPLE

Figure 11:
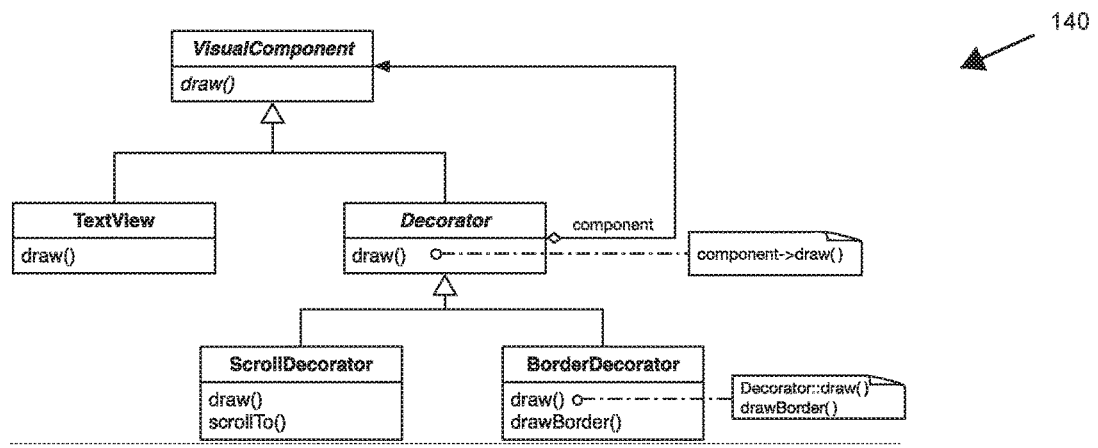
FIG. 11 is a depiction of the Decorator design pattern as an example for code generation.
Figure 12:
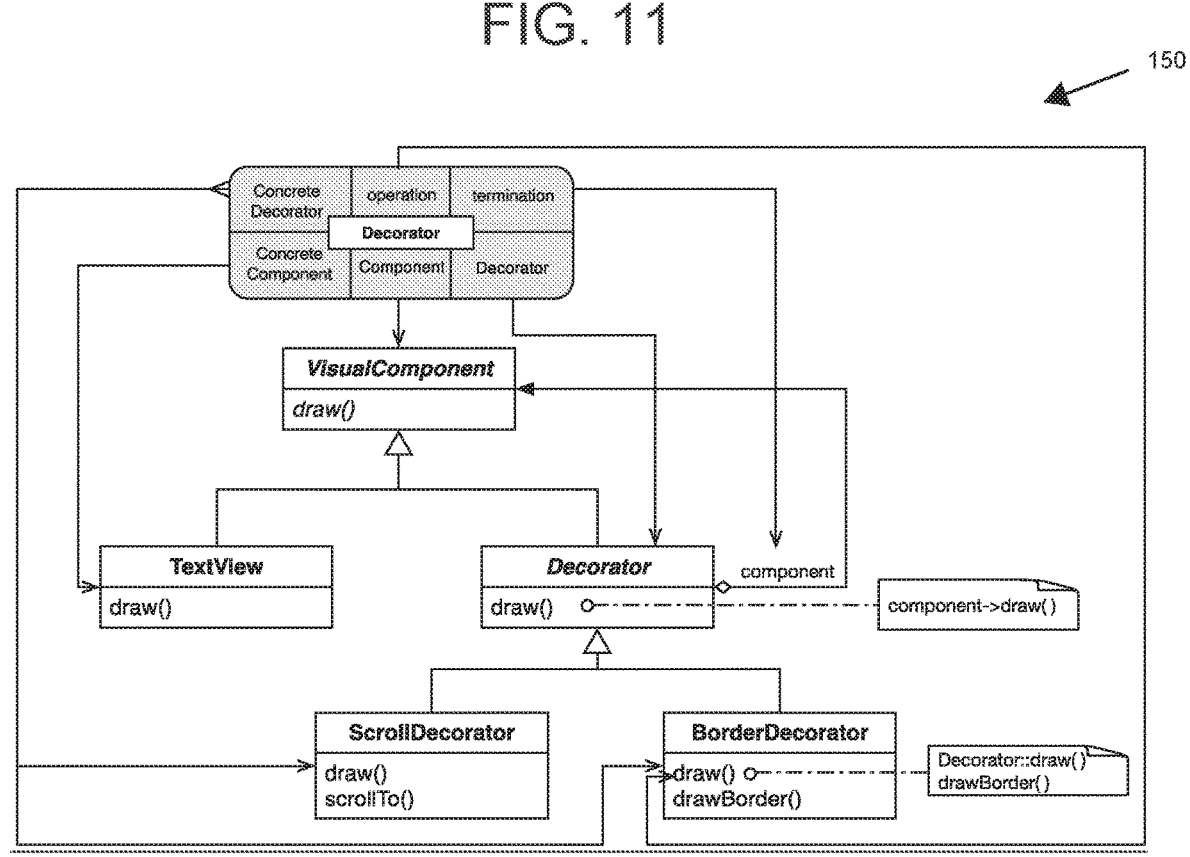
FIG. 12 is a depiction of the Decorator design pattern as an example annotated with PINbox.

An example generating code for C++ 11 from an instance of the Decorator pattern, for instance, could be performed as follows. Start with a very basic intended Decorator instance 140 expressed in a UML model, as in FIG. 11. The designer can select the Decorator design pattern from a catalog and annotate the UML diagram with the relevant PINbox 150 in FIG. 12 showing the bindings of the Decorator instance to the conceptual roles of the conceptual pattern. The UML constitutes the model representing the designer's intended system, and the Decorator PINbox imposes restrictions and properties onto the model that may be distributed among the elements of the model.

There are two instances of Decorator evident in this small model, one using BorderDecorator, and one using ScrollDecorator. The Decorator instance is expressed for BorderDecorator, but the ScrollDecorator instance is nearly identical. From the discussion hereinabove of the formal rho-calculus definition of Decorator, the definition can be expanded level by level while maintaining the bound elements of the original model.

```
Decorator(Component : VisualComponent, Decorator : Decorator,
   ConcreteComponent : TextView,
   ConcreteDecorator : BorderDecorator,
   terminator: drawBorder, operation : draw)
ExtendMethod(OriginalBehavior : Decorator
   ExtendedBehavior : BorderDecorator,
   operation : draw)
!ExtendMethod(OriginalBehavior : Decorator
   ExtendedBehavior : BorderDecorator,
   operation : drawBorder)
ObjectRecursion(Handler : VisualComponent, Recursor : Decorator,
   Terminator : TextView, Initiator : any
   handleRequest : draw, successor : component),
```

At this point, there are two "positive" pattern instances, the first an instance of the ExtendMethod EDP, and one of the ObjectRecursion pattern, each of which must appear in our final implementation. There is also one "negative" EDP, an instance of ExtendMethod that must not appear in our final implementation. This can be treated as a constraint to check later. Expanding ObjectRecursion results in the following:

```
Decorator(Component : VisualComponent, Decorator : Decorator,
   ConcreteComponent : TextView,
   ConcreteDecorator : BorderDecorator,
   terminator : drawBorder, operation : draw)
ExtendMethod(OriginalBehavior : Decorator
   ExtendedBehavior : BorderDecorator,
   operation : draw)
!ExtendMethod(OriginalBehavior : Decorator
   ExtendedBehavior : BorderDecorator,
   operation : drawBorder)
TrustedRedirection(Redirector : Decorator, FamilyHead : VisualComponent,
   target : component, operation : draw),
!TrustedRedirection(Redirector : TextView, FamilyHead : VisualComponent,
   target : component, operation : draw)
Objectifier(Objectifier : VisualComponent, ConcreteClass : Decorator,
   operation : draw),
Objectifier(Objectifier : VisualComponent, ConcreteClass : TextView,
   operation : draw),
init.someMethod <$_\mu$ component.draw,
init : any,
component : VisualComponent,
BorderDecorator.draw <$_\mu^{+,-}$ BorderDecorator.drawBorder
```

ObjectRecursion expanded into two more EDPs, one positive instance of TrustedRedirection, and one negative. The latter is treated as a constraint later as well. There will also be four raw statements from ρ-calculus, placed at the bottom just for clarity hereinbelow.

```
Decorator(Component : VisualComponent, Decorator : Decorator,
    ConcreteComponent : TextView,
    ConcreteDecorator : BorderDecorator,
    terminator : drawBorder, operation : draw)
ExtendMethod(OriginalBehavior : Decorator
    ExtendedBehavior : BorderDecorator,
    operation : draw)
!ExtendMethod(OriginalBehavior : Decorator
    ExtendedBehavior : BorderDecorator,
    operation : drawBorder)
TrustedRedirection(Redirector : Decorator, FamilyHead : VisualComponent,
    target : component, operation : draw),
!TrustedRedirection(Redirector : TextView, FamilyHead : VisualComponent,
    target : component, operation : draw)
FulfillMethod(Abstractor : VisualComponent,
    Fulfiller : Decorator, operation : draw
draw ∈ meth(VisualComponent),
component : VisualComponent ∈ field(Client),
FulfillMethod(Abstractor : VisualComponent,
    Fulfiller : TextView, operation : draw
draw ∈ meth(VisualComponent),
component : VisualComponent ∈ field(Client),
init.someMethod <_μ component.draw,
init : Client,
component : VisualComponent,
BorderDecorator.draw <_μ^+,- BorderDecorator.drawBorder
```

Preferably, each Objectifier instance has expanded into a FulfillMethod with a number of accompanying ρ-calculus statements. At this point there is some duplicate statement from the two expansions of Objectifier, and the redundancy can be culled moving forward, as would be done in an implementation of this method using, as an example, even a rudimentary automated inference engine or database.

The next expansion decomposes all composite patterns into their EDPs, and resulting expanded definition as EDPs is then given as:

```
Decorator(Component : VisualComponent, Decorator : Decorator,
    ConcreteComponent : TextView,
    ConcreteDecorator : BorderDecorator,
    terminator : drawBorder, operation : draw)
ExtendMethod(OriginalBehavior : Decorator
    ExtendedBehavior : BorderDecorator,
    operation : draw)
!ExtendMethod(OriginalBehavior : Decorator
    ExtendedBehavior : BorderDecorator,
    operation : drawBorder)
TrustedRedirection(Redirector : Decorator, FamilyHead : VisualComponent,
    target : component, operation : draw),
!TrustedRedirection(Redirector : TextView, FamilyHead : VisualComponent,
    target : component, operation : draw)
AbstractInterface(Abstractor : VisualComponent, operation : draw),
Inheritance(Superclass : VisualComponent, Subclass : Decorator),
Decorator ≡ [VisualComponent.draw ⇐ draw],
AbstractInterface(Abstractor : VisualComponent, operation : draw),
Inheritance(Superclass : VisualComponent, Subclass : TextView),
TextView ≡ [VisualComponent.draw ⇐ draw],
draw ∈ meth(VisualComponent),
component: VisualComponent ∈ field(Client),
init.someMethod <_μ component.draw,
init : Client,
component : VisualComponent,
BorderDecorator.draw <_μ^+,- BorderDecorator.drawBorder
```

From this list of EDP-defined relationships, such language features can be mapped as exist at this level within the target language. For instance, Abstract Interface is a 1:1 mapping to class inheritance in most OO languages but can also be satisfied by generating function pointer maps in procedural languages. Neither implementation decision needs to be known or cause an alteration at the model level. By implementing the known EDP to C++ 11 mappings, an internal representation can be produced such as an abstract syntax tree and build up a code solution in an incremental manner.

For the purposes of this discussion, the emitted code will be directly provided that conforms to the simplest, canonical implementation that matches the EDP expression. It should be noted that this EDP expression conforms to a large number of possible implementations, and this Decorator instance can be imposed any number of models with vastly different structures. The transitivity operators inherent in the ρ-calculus foundations provide this flexibility.

Starting with the list of clauses from the above definition, ordered as below, the implementation can be emitted. The ordering of the list is arbitrary, and if the clauses are visited by a tool in any order, the result is the same. This ordering is simply to illustrate the method in a simple manner. Redundant clauses have been removed, as would occur during the most basic analysis. It should be noted that this particular mapping to implementation is only valid for C++ 11. However, a suitable mapping to Java, Python, ML, or raw C or assembly can be implemented by choosing appropriate language features for each design primitive.

1. ExtendMethod(OriginalBehavior : Decorator, ExtendedBehavior : BorderDecorator, operation : draw)
2. !ExtendMethod(OriginalBehavior : Decorator, ExtendedBehavior : BorderDecorator, operation : drawBorder)
3. TrustedRedirection(Redirector : Decorator, FamilyHead : VisualComponent, target : component, operation : draw)
4. !TrustedRedirection(Redirector : TextView, FamilyHead : VisualComponent, target : component, operation : draw)
5. AbstractInterface(Abstractor : VisualComponent, operation : draw)
6. Inheritance(Superclass : VisualComponent, Subclass : Decorator)
7. Decorator ≡ [VisualComponent.draw ⇐ draw]
8. Inheritance(Superclass : VisualComponent, Subclass : TextView)
9. TextView ≡ [VisualComponent.draw ⇐ draw]
10. draw ∈ meth(VisualComponent)
11. BorderDecorator.draw $<_\mu^{+,-}$ BorderDecorator.drawBorder
12. component : VisualComponent ∈ field(Client)
13. init : Client
14. init.someMethod $<_\mu$ component.draw As evident from the foregoing list, some clauses will have been implemented by earlier clauses in this case, but that is an artifact of our target language choice. If another language were chosen as our target, the expression of the clauses may look very different, and language features would have less overlap. Constraints 2 and 4 can be left until the end for a check.

An ExtendMethod EDP is shown in clause 1 hereinabove. It is known from the literature that this is a subclass extending the functionality of a superclass' definition of the same method. This is exhibited by the following C++ 11 code for the single clause. Where the code is not specified or constrained, necessary code features are represent with [bracketed] text to indicate that it is a place holder.

```
class Decorator {
    [returntype] draw ( [parameterlist] ) {
    }
}
class BorderDecorator : public Decorator {
    [returntype] draw ( [parameterlist] ) {
        Decorator::draw( [argumentlist] );
    }
}
```

Subsequent steps will use bold to introduce new elements adding from each clause, for clarity.

Clause 3, an instance of TrustedRedirection, expresses a handing of functionality of a method back up a class hierarchy to a superclass. The simplest expression in C++ 11 of this added to clause 1 results in the following:

```
class VisualComponent {
    [returntype] draw ( [parameterlist] ) {
    }
}
class Decorator : public VisualComponent {
    VisualComponent* component;
    [returntype] draw ( [parameterlist] ) {
        component->draw( );
    }
}
class BorderDecorator : public Decorator {
    [returntype] draw ( [parameterlist] ) {
        Decorator::draw( [argumentlist] );
    }
}
```

Clause 5, AbstractInterface, requires that the method stated is purely virtual. In C++ 11, the most straightforward way to accomplish this is with the virtual keyword coupled with a null definition, but note that it is not the only choice. Any appropriate approach may be chosen based on other design constraints.

```
class VisualComponent {
    virtual [returntype] draw ( [parameterlist] ) = 0;
}
class Decorator : public VisualComponent {
    VisualComponent* component;
    [returntype] draw ( [parameterlist] ) {
        component->draw( );
    }
}
class BorderDecorator : public Decorator {
    [returntype] draw ( [parameterlist] ) {
        Decorator::draw( [argumentlist] );
    }
}
```

Clause 6 is redundant, as Clause 3 already established the inheritance between Decorator and VisualComponent. In another target language with dynamic typing instead of static typing, however, this may have not been the case, and the linkage would need to be explicitly made in the typing.

Clause 7 at first glance seems to be redundant with Clause 3, but there is a subtlety here that can be leveraged in C++ 11 with the use of the override keyword to make this explicit.

```
class VisualComponent {
    virtual [returntype] draw ( [parameterlist] ) = 0;
}
class Decorator : public VisualComponent {
```

```
        VisualComponent* component;
        [returntype] draw ( [parameterlist] ) override {
            component->draw( );
        }
    }
    class BorderDecorator : public Decorator {
        [returntype] draw ( [parameterlist] ) {
            Decorator::draw( [argumentlist] );
        }
    }
```

Clause 8 introduces a new inheritance reliance, and the simplest implementation form is again chosen. There is nothing in this clause that indicates that the inheritance must be direct, however. ρ-calculus offers transitivity of these core reliances such that the Inheritance EDP can be satisfied by an indirection inheritance traversing any number of intermediate types. This is often the case in complex system designs, when the application of a design pattern in its canonical, simplest form is insufficient for capturing the variances needed to bring a design to successful implementation. And, it is that specific insufficiency, among others, that is overcome or solved by embodiments of the present invention.

```
    class VisualComponent {
        virtual [returntype] draw ( [parameterlist] ) = 0;
    }
    class TextView : public VisualComponent {
    }
    class Decorator : public VisualComponent {
        VisualComponent* component;
        [returntype] draw ( [parameterlist] ) override {
            component->draw( );
        }
    }
    class BorderDecorator : public Decorator {
        [returntype] draw ( [parameterlist] ) {
            Decorator::draw( [argumentlist] );
        }
    }
```

Clause 9, much as with Clause 7, specifies a need for an implementation of a named method in the subclass to override the implementation of the same method in the superclass.

```
    class VisualComponent {
        virtual [returntype] draw ( [parameterlist] ) = 0;
    }
    class TextView : public VisualComponent {
        [returntype] draw ( [parameterlist] ) override {
        }
    }
    class Decorator : public VisualComponent {
        VisualComponent* component;
        [returntype] draw ( [parameterlist] ) override {
            component->draw( );
        }
    }
    class BorderDecorator : public Decorator {
        [returntype] draw ( [parameterlist] ) {
            Decorator::draw( [argumentlist] );
        }
    }
```

Clause 10 requires that there be a method named draw within the VisualComponent type. It can be confirmed that this clause is satisfied.

Clause 11 introduces a final required and necessary component of the Decorator pattern, that the implementation of the draw method defined in the BorderDecorator type call, in some manner, a method named drawBorder defined in the same type, and within the same instance of the type. It should be noted that this call does not need to be direct, again due to the transitive properties of ρ-calculus, however, again, the most straight-forward expression is chosen here in the absence of any other design constraints.

```
    class VisualComponent {
        virtual [returntype] draw ([parameterlist] ) = 0;
    }
    class TextView : public VisualComponent {
        [returntype] draw ( [parameterlist] ) override {
        }
    }
    class Decorator : public VisualComponent {
        VisualComponent* component;
        [returntype] draw ( [parameterlist] ) override {
            component->draw( );
        }
    }
    class BorderDecorator : public Decorator {
        [returntype] draw ( [parameterlist] ) {
            Decorator::draw( [argumentlist] );
            self->drawBorder( [argumentlist] );
        }
        [returntype] drawBorder ( [parameterlist] ) {
        }
    }
```

Clauses 12-14 describe an object external to the above relationships that initiates the call into the pattern and begins its operation. These three clauses can be viewed in isolation.

Clause 12 specifies a field named component, of type VisualComponent, and it is added to the set of field elements of a type named Client. Since the VirtualComponent class is involved in the TrustedRedirection of clause 3, and that requires traversal of polymorphic virtual function tables in the C++ language family, and further that VisualComponent has been created as a pure virtual class, a pointer-based field is chosen for implementation and can satisfy this clause with the following addition:

```
    class Client {
        VisualComponent* component;
    }
```

Clause 12 is a raw ρ-calculus statement that there is an external entity named init of type Client. There are a number of possible implementations by which this can be satisfied, and generally speaking this would be bound to another element of a larger design model for the intended system. In this case, a namespace-scoped object can be made, shown in isolation.

Client init;

Clause 13, much like Clause 12 is under-specified, and indicates that the above object of type Client contains a method named someMethod that calls the draw method of the instance's component field of type VisualComponent. We can combine this with Clause 12 and our prior Clause 11 generated Client class in C++ 11 as:

```
    class Client {
        VisualComponent* component;
        [returntype] someMethod ( [parameterlist] ) {
            component->draw( [argumentlist] );
```

```
    }
  }
  Client init;
```

From the above implementation decisions, a complete listing of the generated code can be produced, as well as stating specifically where the above instance of a Decorator pattern does not alter, restrict, or otherwise constrain the designer from making additional design decision in the production of the system. In a large industrial scale software design, these elements are defined by the designer as a regular part of the production of a software model. Generally, no under-specification is expected and optionally can be explicitly disallowed during the generation of source code for the implementation of a software design.

The introduction of design patterns into the model is often an attempt to provide a richer semantic understanding of the intent of the design, yet can lead to an overly-constrained implementation as those creating the implementation attempt to satisfy both the original design, and what are inaccurately perceived as rigid design pattern structures. Using the systems and methodology described herein, a software designer is free to select design patterns as a higher-level description of intended relationships and functionality that are often difficult to describe in modeling languages and tools, and then alter the underlying design at will, while remaining confident that the underlying relationships that form the chosen patterns are preserved.

A full listing of the result from the above small example expressed in C++ 11 follows. It can be seen from inspection that there is no instance of the ExtendMethod EDP prohibited in Clause 2, as the drawBorder method of class BorderDecorator does not call back to Decorator's instance of drawBorder, as the draw method does to a similarly named method. It can also be seen that Clause 4 is satisfied, as the prohibited TrustedRedirection EDP does not exist in the draw definition within the TextView class type.

Additionally, the second Decorator instance can be added concerning ScrollDecorator, recognizing that all but Clause 1, 2 and 11 are redundant. The following skeleton code conforms to our original model expressed in FIG. 11.

```
            class VisualComponent {
              virtual [returntype] draw [parameterlist] ) = 0;
            }
            class TextView : public VisualComponent {
              [returntype] draw ( [parameterlist] ) override {
                [unspecified statements]
              }
            }
            class Decorator : public VisualComponent {
              VisualComponent* component;
              [returntype] draw ( [parameterlist] ) override {
                [unspecified statements]
                component->draw( );
                [unspecified statements]
              }
            }
            class BorderDecorator : public Decorator {
              [returntype] draw ( [parameterlist] ) {
                [unspecified statements]
                Decorator::draw( [argumentlist] );
                self->drawBorder( [argumentlist] );
                [unspecified statements]
              }
              [returntype] drawBorder ( [parameterlist] )
                [unspecified statements]
              }
```

```
            }
            class ScrollDecorator : public Decorator {
              [returntype] draw ( [parameterlist] ) {
                [unspecified statements]
                Decorator::draw( [argumentlist] );
                self->scrollTo( [argumentlist] );
                [unspecified statements]
              }
              [returntype] scrollTo ( [parameterlist] ) {
                [unspecified statements]
              }
            }
            class Client {
              VisualComponent* component;
              [returntype] someMethod ( [parameterlist] ) {
                [unspecified statements]
                component->draw( [argumentlist] );
                [unspecified statements]
              }
            }
            Client init;
```

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed:

1. A method for generating computer source code from a model such that a resulting source code is to be generated in a desired programming language, and the model and the generated source code form a correspondence of conceptual design, the method comprising:
  including design patterns in a catalog of pre-existing design patterns;
  creating formal definitions of the design patterns in the catalog in terms of elemental design patterns (EDPs);
  selecting the design patterns according to original design decisions to provide an abstract form model representing an abstracted view of a computer program;
  binding the selected design patterns to elements in the model to produce bindings;
  using the formal definitions of the EDPs to re-express the initial model as the abstract form model;
  repeating steps of the including, the creating, the selecting, the binding, and the using with respect to the abstract form model to further express the abstract form model;
  mapping the EDPs of the abstract form model to constructs in one of a target programming language, assembly language, or bytecode language to produce mapped constructs;
  emitting a graph of the mapped constructs as embodied in the abstract form model in the one of the target programming language, the assembly language or the bytecode language, thereby creating a source code implementation of the computer program that corresponds to the original design decisions; and
  repeating steps of the including, the creating, the selecting, the binding, the using, the mapping, and the emitting to create the source code implementation.

2. The method of claim 1 wherein the step of the binding further comprises:
  converting the abstract form model to a format suitable for validation and verification using an automated inference engine;

querying the automated inference engine to provide query results indicating suitability of the bindings and/or a need for additional bindings; and providing the query results through a modeling tool to guide users to revise the step of the binding to include desired design pattern instance roles to be bound to the elements.

3. The method of claim 1 further comprising converting resulting EDP expressed in the abstract form model to a format suitable for validation and verification against desired properties by an automated inference engine.

4. The method of claim 3 further comprising querying the automated inference engine to confirm properties of the abstract form model.

5. The method of claim 4 wherein the querying the automated inference engine to confirm the properties of the abstract form model is performed with a modeling tool.

6. The method of claim 1 further comprising using the graph to generate an abstract syntax tree representation of the abstract form model, and emitting the abstract syntax tree in the target programming language.

7. The method of claim 1 further comprising using the graph to generate an abstract syntax tree representation of the abstract form model, and emitting the abstract syntax tree in the assembly language.

8. The method of claim 1 further comprising using the graph to generate an abstract syntax tree representation of the abstract form model, and emitting the abstract syntax tree in the bytecode language.

* * * * *